United States Patent [19]
Pitt

[11] 3,959,007
[45] May 25, 1976

[54] PROCESS FOR THE PREPARATION OF SILICEOUS ASHES

[75] Inventor: Norman Pitt, Los Angeles, Calif.

[73] Assignee: Structural Materials, Los Angeles, Calif.

[22] Filed: Oct. 19, 1973

[21] Appl. No.: 407,907

Related U.S. Application Data

[62] Division of Ser. No. 276,134, July 28, 1972, abandoned.

[52] U.S. Cl. .............................. 106/288 B; 431/173
[51] Int. Cl.² ......................... C09C 1/28; F23C 5/18
[58] Field of Search ............... 106/288 B, 309, 120; 423/335; 431/173; 110/18 R

[56] References Cited
UNITED STATES PATENTS

| | | | |
|---|---|---|---|
| 1,363,879 | 12/1920 | Junghandel | 106/98 |
| 1,614,913 | 1/1927 | Barnebey | 423/335 |
| 2,395,103 | 2/1946 | Clausen et al. | 431/173 |
| 2,410,954 | 11/1946 | Sharp | 106/98 |
| 2,483,780 | 10/1949 | Parmele | 431/173 |
| 2,720,462 | 10/1955 | Jones | 106/63 |
| 2,911,926 | 11/1959 | Kocee | 110/18 R |
| 3,048,215 | 8/1962 | Huckabee | 431/173 |
| 3,106,955 | 10/1963 | Flasskamp et al. | 431/173 |
| 3,125,043 | 3/1964 | Gravel | 110/28 |
| 3,179,150 | 4/1965 | Arnold | 431/173 |
| 3,451,944 | 6/1969 | Finch | 252/421 |
| 3,574,816 | 4/1971 | Abbdellatif | 106/120 |

FOREIGN PATENTS OR APPLICATIONS

| | | | |
|---|---|---|---|
| 2,070,383 | 9/1971 | France | 106/288 B |
| 756,689 | 9/1956 | United Kingdom | 106/69 |
| 697,474 | 9/1953 | United Kingdom | 106/69 |

*Primary Examiner*—Delbert E. Gantz
*Assistant Examiner*—James W. Hellwege
*Attorney, Agent, or Firm*—Julian J. Schamus

[57] ABSTRACT

A process and apparatus for the incineration of organic material, and particularly agricultural waste products, to produce useable energy, consists of exposing the material to elevated temperature in an excess of air in a cylindrical furnace which terminates at the top in a frustum of a cone, the furnace having tangential inlet means at the bottom and discharge means comprising a concentric hollow cylinder projecting into the bottom portion of the furnace; the process and apparatus are particularly useful in the preparation of siliceous compositions from materials such as rice hulls and the process can be conducted under conditions whereby a highly reactive amorphous form of silica is produced, which silica is useful as a component of hydraulic cements.

3 Claims, 4 Drawing Figures

PROCESS FOR THE PREPARATION OF SILICEOUS ASHES

This is a division of application Ser. No. 276,134, filed July 28, 1972, now abandoned.

BACKGROUND OF THE INVENTION AND PRIOR ART

Agricultural waste materials such as rice hulls, rice straw, wheat chaff and straw have a potential useful fuel value which is difficult to convert into useful energy or a useful product. In fact, it now represents a substantial problem to the industry to dispose of the large quantity of unuseable waste materials produced in agriculture.

It has also been recognized that certain agricultural organic materials are high in biogenetic silica, that is, silica occurring within the cell structure. Principally, rice hulls, rice stalks, equisetum, (a common weed popularly known as horsetails) and certain palm leaves, particularly palmyra palm, have varying amounts of silica in the cell structure. In addition, certain bamboo stems are known to contain relatively large amounts of silica and wheat straw contain from 2 to 3 percent silica in the cell structure. For example, most rice hulls are generally found to contain approximately 20% silica while rice straw may have approximately 18½% silica. Certain California horsetail weeds are known to have about 20 to 25% silica.

The disposition of rice hulls and rice straw has become a substantial problem to the rice growing industry inasmuch as they apparently can be disposed of only by burning or burying. Dump space for burying the material has become scarce in the last few years and the incineration of the silica bearing hulls and straw in open fields generally creates undesirable atmospheric pollutants.

It has been known, of course, that silica, along with calcium oxides, is a component of portland cement, primarily occurring as complex calcium silicates. However, the silica produced by the incineration of silica containing organic agricultural materials can be used as a cement component only to the extent that it replaces sand or shale, because the incineration of the hulls inevitably leads to the production of ash containing crystalline forms of silica.

The phase diagram of silicon dioxide indicates that a transition from the amorphous, non-crystalline form of material to the crystalline forms known as tridymite and crystobalite takes place at very high temperatures when the silica is in pure state. Thus, with pure silica in the amorphous form, it is theoretically necessary to raise the temperatures above 2000°F to effectuate the transformation. However, the incineration of rice hulls, even at temperatures substantially below 2000°F, has always lead to the formation of crystalline varieties of silica, because the transition temperature from amorphous to crystalline is reduced substantially by the presence of other components of the original rice hulls.

Prior attempts to use crystalline silica as an active component of portland cement have always involved heat treating mixtures of limestone and siliceous shales or clays at temperatures in excess of 2600°F. The same objective can also be accomplished by application of mechanical energy. Experimentally, it has been shown that attrition grinding of crystalline quartz can activate the silica by rupturing the chemical bonds at the surface. In addition to attrition grinding, vibromilled sand-lime mixtures which are attrition ground, have been reported to have acquired binding properties, and thus treated lime-sand mixtures have been used as hydraulic cements.

These processes, except for the commercial process of heating a siliceous raw material with limestone, appear to be commercially unattractive because of the excessive mechanical energy necessary in the vibromilling and attrition grinding processes.

It has recently been discovered that a highly useful amorphous form of silica may be produced by the careful, controlled incineration of rice hulls at relatively low temperatures and oxidizing atmospheres. In the original discovery, rice hulls were incinerated in a relatively oxidizing atmosphere in an electric furnace in small quantities by gradually raising the temperature of the rice hulls. It was observed that smoke began to generate from the rice hulls at about 400°F and that as the incineration temperature increased up to about 1200°F, it was possible after long exposure to heat to produce a product containing almost completely amorphous silica with a relatively low loss on ignition content (indicative of residual carbon in the mass).

It has also been found that on exposure to temperatures above approximately 1300°F, a transition to the crystalline forms of silica takes place, and the extent of this transition is dependent upon the length of time of exposure to these elevated temperatures.

It has been discovered that this amorphous form of silica is highly reactive in nature and has utility in the preparation of novel cement compositions similar in property to portland cement.

The laboratory method used to produce the amorphous silica was not amenable to the large scale disposition of rice hull, or in fact, the relatively large scale preparation of the amorphous product thereby produced.

It is to be noted that according to the phase diagram of silicon dioxide, when the compound is in the relatively pure state, amorphous silica must be heated to temperatures in excess of about 2600°F before there is a transition to the tridymite or crystobalite forms of silica. However, in the impure form of silica found in rice hulls, it has been experimentally observed that the transition from the amorphous form to the crystalline tridymite or crystobalite form occurs at a much lower temperature, due to the impurities present. In the past it has been common practice, solely for the purpose of disposing of the rice hull waste, because of its large bulk density in the unburned condition, to simply incinerate the rice hulls in the most rapid expeditious manner. This has been accomplished in several ways. Bulk burning of the rice hulls has been resorted to in large piles of rice hulls in which the temperatures vary considerably depending upon the location of the hull in the pile. In other methods, special furnaces have been designed to incinerate the rice at extremely high temperatures without regard to the form of silica produced by the incineration. In all of these methods, crystalline silica has been the result and this crystalline silica is of little commercial utility. Thus, in the usual incineration of rice hulls at 1800°F, any prolonged exposure to the 1800°F temperature causes an almost complete transformation from the amorphous form of silica to crystalline tridymite or crystobalite form.

In attempting to overcome the disadvantages of prolonged slow oxidation in the incineration of rice hulls to produce amorphous silica, it has been found that there is a process which will not only form silica having a high degree of amorphous silicon dioxide but having a variable range of residual organic material which has a high degree of utility as a cement component.

SUMMARY OF THE INVENTION

The present invention is a novel method for the preparation of amorphous silica from agricultural wastes in which the agricultural wastes such as rice hulls are incinerated at a gas mass temperature of between 1250° and 1750°F at relatively high levels of turbulence under conditions whereby the temperature of the incinerated agricultural material does not exceed about 1300°F; said process being conducted while subjecting said rice hulls to vertical and centrifical forces during the initial combustion stages in an oxidizing atmosphere.

Another aspect of the invention comprises an apparatus for incinerating waste agricultural material, which apparatus consists of a furnace of novel design and a method for conducting combustion in said furnace and recycling a portion of the throughput.

Still another aspect of the invention is the provision of a process and equipment for generating useful energy by the incineration of waste agricultural matter such as chaff, straw and rice hulls.

OBJECTS OF THE INVENTION

It is an object of this invention to provide a novel process for the preparation of amorphous silica material from a silica containing organic agricultural product.

It is a further object of this invention to provide a process for the disposition of organic agricultural waste materials and particularly those having a relatively high initial silica content.

Another object of this invention is the production of useful energy from organic agricultural waste material.

A further object is the provision of a novel combustion furnace which is capable of accomplishing the above objects by the incineration of organic material.

BRIEF DESCRIPTION OF THE DRAWINGS

In the drawings accompanying this application:

FIG. 4 is a diagrammatic representation of one embodiment of the invention adapted for the production of steam from heat generated in the furnace shown in FIG. 1.

DETAILED DESCRIPTION OF THE DRAWINGS AND INVENTION

Figure 1:
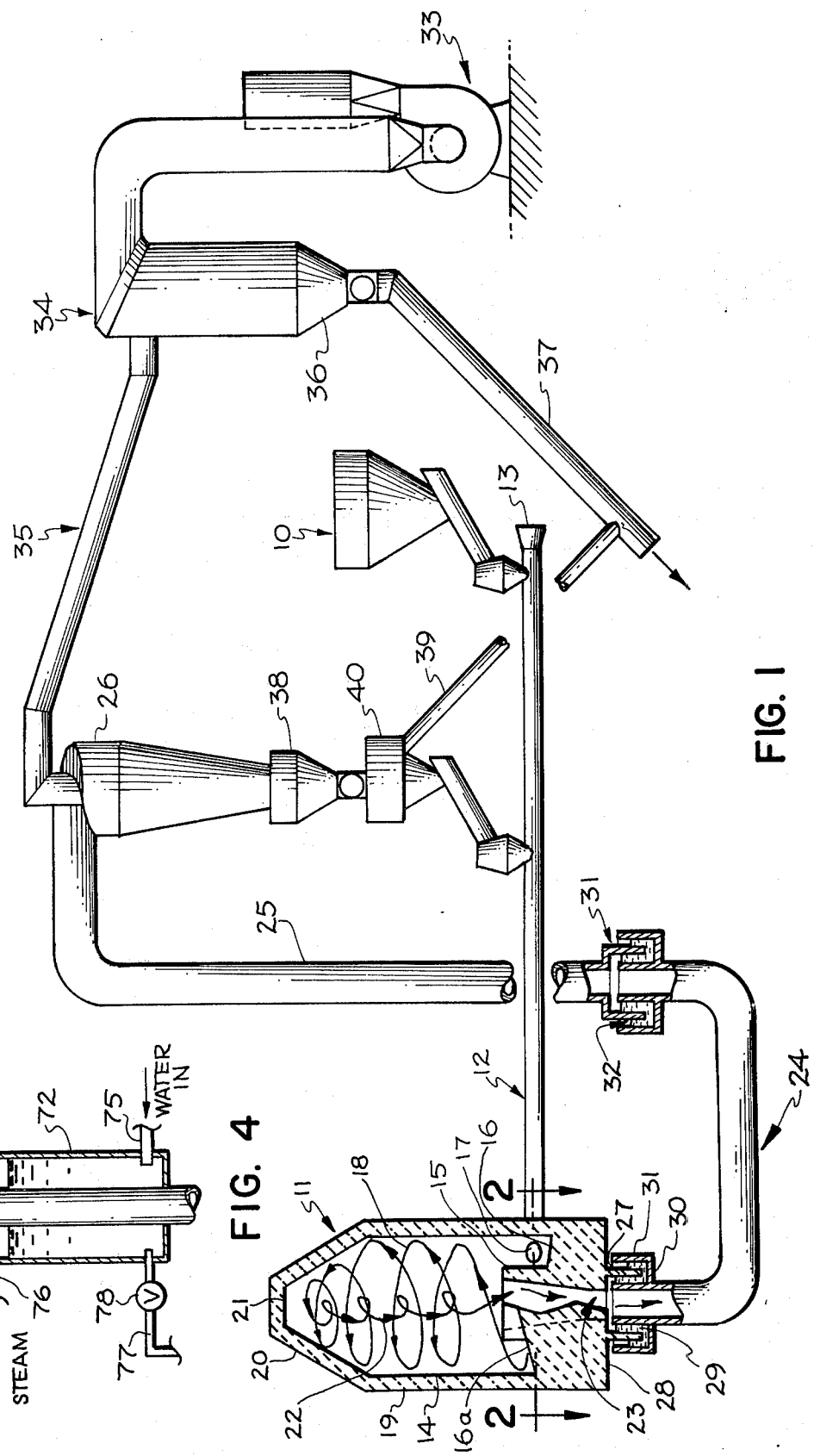
FIG. 1 is an overall representation of the process of this invention showing a vertical cross section of one form of the incineration furnace employed.

Referring now specifically to FIG. 1, there is shown a partially schematic, partially cut away view of the apparatus for conducting the process of this invention in which rice hulls initially stored in the hopper 10, are introduced into a refractory lined furnace 11, through the intake pipe 12. The end 13 of the pipe 12, is open to allow for the introduction of air into the system as will be described hereinafter. The furnace 11, has refractory lining 14, and a central cylindrical portion 15, projecting above the floor 16. The floor 16, is in the form of a spiral ramp of one revolution as illustrated by the diagonal line 16a in FIG. 1. The intake pipe 12 projects the rice hull air mixture into the furnace 11, approximately tangentially just ahead of the lowest portion of the spiral ramp. Immediately following the tangential intake 12 there is an inlet 17 which is used during startup operations for the introduction of a combustible gas-air mixture used to provide the initial heat source required for the initiation of combustion of the air-rice hull mixture.

As the air-rice hull mixture is introduced into the furnace 11 through the intake tube 12 and ignited with the aid of combustible gas-air mixture entering through the inlet 17, the mixture proceeds upwardly around the periphery of the furnace 11 and continues to rise adjacent to the exterior wall of the furnace in the pattern such as shown by the helical line 18. The bottom portion of the furnace has exterior wall generally forming a cylindrical configuration; however, the uppermost portion of the furnace is in the shape of a frustum of a cone as illustrated at 20. This configuration causes the upwardly ascending gases to be more confined in their spiral movement toward the apex 21 and to reverse in direction and descend through the central portion of the furnace in a descending helix as illustrated by the continuation 22 of the line 18.

The descending mixture leaves the furnace 11 through the discharge hole 23 which begins at the uppermost portion of the center cylinder 15 and leads into a U-shaped discharge pipe 24 which communicates through the pipe 25 with a cyclone separator shown generally at 26.

The above description of the furnace 11 is a superficial indication of the manner in which, primarily the gaseous material moves through the furnace. Although the pattern generally with respect to the materials is as indicated by the sprial arrow 18 and 22, the indicated pattern holds true primarily only for the gases which move through the furnace. The solid material (rice hulls) initially entering the furnace have a lower density than the completely combusted silica which is effluent therefrom.

However, the bulk density of the partially combusted rice hulls is actually lower than the bulk density of the uncombusted rice hulls, even though the particle density of the silica is much greater than the particle density of the rice hull.

Because of the pattern of the material flow and the extent of the centrifugal force exerted by the flow through the furnace as organic material is removed in the furnace by the combustion process, the particle density of the material increases and the effect of the centrifugal force is to force the more completely combusted particles outwardly toward the furnace wall irrespective of whether they are moving in an upwardly or downwardly direction in the furnace.

Thus, there is a build up of relatively completely incinerated material at or near the side wall of the furnace as the combustion process approaches steady state. At steady state the geometry of the furnace and the gas flow balances the movement of the completely incinerated particles to cause an internal recirculation of the particles without ultimately clogging the furnace.

The U-shaped discharge pipe 24 is connected to the furnace 11, by means of a seal assembly consisting of an annular ring 27, projecting downwardly from the lower exterior surface 28, and around the discharge 23; and an annular channel 29, formed by the walls of the discharge pipe 24, the circumferential plate 30 and the cylindrical extension 31, which is concentric to the upward extension of the pipe 24. As indicated by the drawing, the annular ring 27, projects into the channel 29, which is filled to above the lowest level of the ring 27, with a fluid to form a seal. This seal is required to compensate for the expansion and contraction of the furnace and the discharge pipe 24 during start up and operation of the furnace as well as shut down.

Similarly the pipe 25, leading to the cyclone 26, and the discharge pipe 24, are connected by a similar liquid seal to compensate for the fact that temperatures in the discharge pipe 24 are generally higher than in the pipe 25. The lower portion of the pipe 25, is flanged as shown at 31 to form an annular ring which projects into the annular channel 32, which is liquid filled.

As shown in FIG. 1, the liquid level in the seals is higher in the interior portion thereof indicating that the furnace is in operation at below atmospheric pressure. However, it is to be noted that the furnace can be made to operate at above atmospheric pressure by reversing the open end of the system. That is, the exhaust fan 33, draws air into the system through the opening 13, thus creating sub-atmospheric conditions; to operate at above atmospheric pressure, it is only required to place a fan or pump at the opening 13, to force air into the system and eliminate the fan 33, simply allowing the exhaust gas to leave the system at the discharge side of the multiclone 34.

Material not separated in cyclone 26 passes through the overhead pipe 35 to the multiclone separator 34 so that "fines" can be separated from the system and collect in the hopper 36 for ultimate discharge from the system through the discharge pipe 37.

The larger particulate materials collected from the cyclone 26 are accumulated in the hopper 38 and either discharged through the pipe 37, line 39 (mixed with the fines if desired) or fed to the recirculation hopper 40 to recycle to the furnace. Recycle is an optional aspect of the combustion process, as is the two stage separation in the separators 26 and 34.

The furance 11 can be constructed in a variety of sizes to handle various throughputs of material to be incinerated, and may then have a wide range of diameter and be of varying height. However, there is a preferred relationship between the heights of the furnace from the lowermost portion of the spiral ramp to the uppermost portion of the cylindrical wall below the tapered section 20. As the ratio of the height to diameter increase, the gas temperature in the furnace will tend to decrease, all other variables being held constant. The velocity of the material in the furnace is a function of the square of the diameter and the height, and the theoretical upper limit of permissible velocity is determined by the flame propagation rate of the burning material.

However, from a practical standpoint, the velocity should be limited by the economics of pumping or blowing the material through the furnace, and the practical economic limit of pressure drop is not more than about 8 inches of water.

The height of the conical, or upper portion 20, of the furnace should be about $0.96 \pm 5\%$ times the diameter of the cylindrical portion and the diameter of the uppermost portion at the top 21 of the frustum of the cone should be about $0.9 \pm 5\%$ times the diameter of the base. The height of the cylindrical portion 19 of the furnace, in a preferred embodiment of the invention is about $1.39 \pm 5\%$ times the diameter of the cylindrical itself, measured from the lowest portion of the spiral ramp or floor 16.

The size of the center cylinder 15 controls the velocity of the material which enters via the ramp 16a, and the velocity of the discharge to the discharge pipe 24; and in a preferred embodiment of the invention has an internal diameter at the top of about $0.65 \pm 5\%$ of the diameter of the cylinder 19, while the height of cylinder 15 above the floor 16 at the low point of the ramp 16a is about $0.54 \pm 5\%$ times the diameter of the cylinder 19.

In another embodiment of the invention, the sections of the furnace designated as cylinder 19 and conical portion 20 are a single cylinder having a height of about $2.35 \pm 5\%$ times the diameter. Although it has been found that a slight taper in the upper section of the furnace aids in the reversal of the mass flow from bottom-to-top to top-to-bottom, it is not an indispensable feature of the furnace.

It should also be noted that the center cylinder 15 may taper in its inside diameter to the diameter of the discharge tube 24. Whereas, the diameter at the top of the cylinder 15 controls the discharge velocity, the diameter of the junction of the hole 23 and tube 24, controls the capacity of the furnace, and for maximum capacity, varies with the temperature at which the furnace is designed to operate at maximum capacity. In another preferred embodiment, at a design temperature of 1600°F the junction diameter (that is the diameter at the bottom of the hole 23) is about $0.58 \pm 5\%$ of the diameter of the cylinder 19. The preferred condition of the diameter at the bottom of hole 23 based on a cylinder 19 diameter of unity can be expressed by the following function:

$$\left(\sqrt{\frac{D}{0.75}}\right)\frac{V}{2000}$$

Where D is the gas density and V is the actual gas volume expressed in cubic feet per minute.

For the use of the process using the apparatus of this invention to produce amorphous silica from rice hulls, it is preferred to design to a temperature of about 1550°F.

Figure 2:
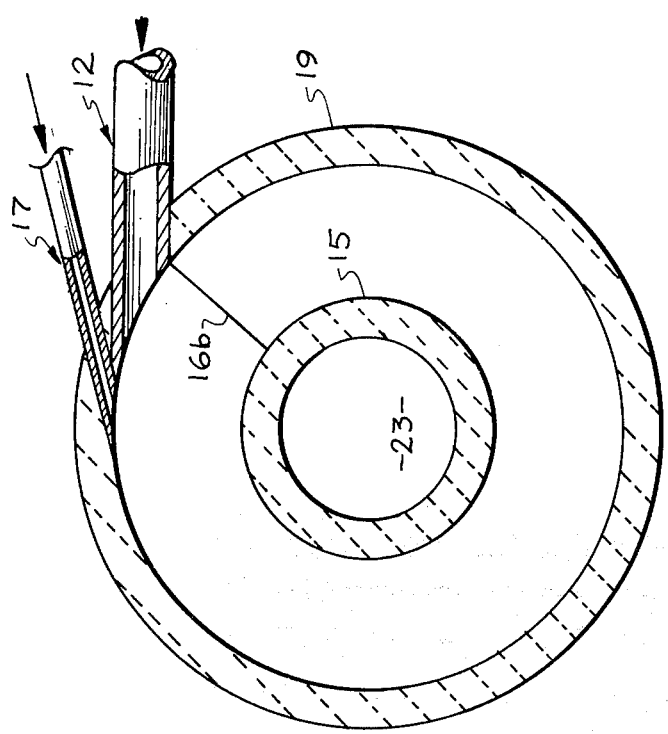
FIG. 2 is a horizontal cross-section of the furnace taken along the line 2—2 of FIG. 1.

Referring specifically to FIG. 2, the "step" of the spiral ramp is illustrated at 16b as immediately following (in a counter-clockwise sense) the material intake pipe 12. Immediately following the intake pipe 12 of the spiral ramp there is illustrated a combustible gas inlet 17. The external refractory wall 19, as indicated earlier, may be constructed of any suitable refractory material either in brick form or case or may be prepared from rammed refractory in which the furnace is gradually built up with layers of refractory cement shot from a vibrating gun, which will withstand the working temperatures of the furnace. The precise refractory material used is a matter of choice. In the example which follow, a cast refractory furnace prepared from clay and aluminum oxide having a rated temperature of 2100°F was employed. It should also be pointed out that it is preferred that the discharge pipe 24 be refractory lined while the pipe 25 following the discharge tube 24 be fabricated from steel.

The center cylinder 15, enclosing the discharge hole 23, as well as the bottom of the refractory furnace, may be constructed from the same material as the external cylinder walls 19.

Figure 3:
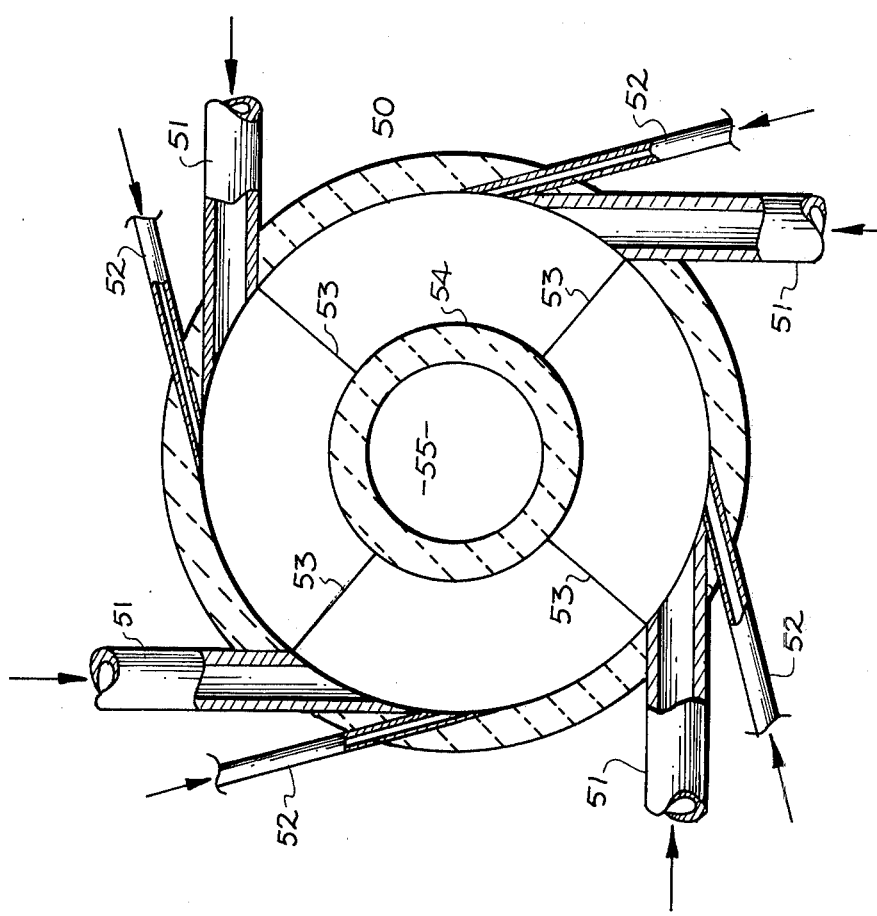
FIG. 3 is a view similar to FIG. 2 illustrating a modification of one embodiment of the invention.

In FIG. 3, there is illustrated a cross-section of another embodiment of the invention showing the bottom of the furnace including the various tangential inlets and segmented partial spiral ramps enclosing the discharge hole. In the embodiment illustrated by FIG. 3, there are four material inlet pipes 51, emitting material to be incinerated in an air stream, generally tangential through the exterior circular wall 50. Immediately upstream of each inlet 51, is a combustion gas inlet 52. As illustrated by the radial lines 53, there are four segmented spiral risors. Each begins at the lowest level of the floor of the furnace and rises to a position above the top of inlet pipe 51, following in a counter-clockwise direction. It is to be noted that the counter-clockwise direction of the furnace which is illustrated is for convenience only and may be reversed.

In the embodiment illustrated in FIG. 3, the center cylinder is designated by the numeral 54, and the discharge hole by 55.

As has been previously pointed out, and as is illustrated diagrammatically in FIG. 4, the furnace may be employed in a process for the production of useful energy in the form of steam. The risor pipe equivalent to the pipe 25 in FIG. 1, illustrated at 71 in FIG. 4, has a large volume of hot gas and particulate matter flowing therethrough. In order to utilize the heat in the pipe 71, it may be surrounded by a heat exchanger 72, in which there is a water inlet 75, provided at the bottom thereof. As water rises in the heat exchanger 72, it is progressively heated and forms steam as illustrated by 74 of FIG. 4, and steam is emitted through pipe 76 for any desired purpose. As illustrated, the bottom of the heat exchanger 72, is fitted with a blow down pipe 77 and a valve 78. Any form of heat exchange arrangement may be employed in which water 73, is efficiently converted to steam, and such devices are well known in the art; FIG. 4 being for diagrammatic purposes only. The precise amount of steam developed depends upon the quantity of material passing through pipe 71, the pressure maintained in the heat exchanger, the efficiency of the heat exchanger and the operating conditions in the furnace. When the furance is employed primarily for the purpose of producing amorphous silica, the true fuel valve of agricultural waste material is not utilized. However, the furnace can be operated under conditions whereby the prime purposes are to utilize the entire fuel value of material being incinerated, which in the case of rice hulls is about 6,000 BTU per pound. In such instances, temperatures above 1600°F can be employed and the capacity of the furnace 11, can be increased to about 50,000 BTU per cubic foot. However, it has been found that for the production of amorphous silica it is preferred to operate the furnace at a capacity of not more than 30,000 BTU per cubic foot.

The following examples illustrate the processes of this invention and the use of the equipment herein described.

EXAMPLE I

Employing a refractory furnace of the type described above in conjunction with the furnace and associated equipment, illustrated in FIG. 1, the fan 33 was set for a flow of 3200 actual cubic feet of gas per minute at an exhaust temperature of 400°F to start the furnace, the air flow was dampered 50% and the gas burner 17, was ignited and the furnace heated until the temperature of the gas in the discharge tube 23, was approximately 800°F, at which point the rice hulls were introduced at the rate of approximately 100 pounds per hour through the feed hopper intake tube 12. It is, of course, understood that operation of the fan 33, draws air through the end of the intake tube 12. As the combustion process commenced, the temperature rose to 1200°F at which time the air flow and rice hull feed increased 20% while maintaining the temperature in the tube 23, at not below 1200°F. Both the air and rice hull addition rates were increased until the total rated amount of air flow was introduced into the furnace and the temperature reached 1600°F, at which time rice hulls were added at the rate of 500 pounds per hour. The rate of rice hull addition was increased at full air capacity until the rice hulls were introduced at the rate of 850 pounds per hour and the temperature in the furnace rose to approximately 2100°F. The material which was effluent through the discharge pipe 37, contained considerable amounts of crystalline silica and was black, indicating a carbon content of from 12 to 14%. During this process, material was recirculated into the furnace through the recirculation hopper 40, at a rate as high as six parts of recirculated material to one part of fresh feed. This Example I illustrates the use of the furnace 11, to generate heat convertable to steam and the consequent production of partially crystalline silica when rice hulls are employed as the starting material.

EXAMPLE II

Using a quantity of par boiled and dried Arkansas rice hulls at the rate of 350 pounds per hour in the apparatus described in FIG. 1, the process of Example I was repeated adjusting the air flow so as to reach maximum bulk gas temperature in the furnace of 1250°F. The resulting silica contained about 12% carbon and was amorphous in character.

EXAMPLE III

The procedure of Example II was repeated using a quantity of Sacramento, Calif., area rice hulls instead of the Arkansas variety. These hulls were not par boiled prior to the incineration process and produced an amorphous ash having a higher carbon content than the par boiled Arkansas hulls.

EXAMPLE IV

A large quantity of the amorphous silica was prepared from Sacramento, Calif., area rice hulls in the refractory furnace described above. The maximum temperature of the gas mass was 1550°F, and the rice hull feed was 500 pounds per hour.

The material produced in this example was amorphous silica, and showed from 12 to 14% loss of organic residue upon ignition (essentially unburned carbon); had an indicated surface area of 25.5 square meters per gram, a "Silica activity index" of 53, and was black in color.

Loss on ignition was determined by heating a weighed portion of the material in a Pt. crucible at 1000°C in an oxidizing atmosphere for 1 hour, cooling and weighing and then reheating for 15 minutes and so forth until a constant weight was obtained upon cooling.

Surface area was determined by the standard B.E.T. nitrogen absorption method.

The Silica activity index is an indication of the reactivity of silica present in a material, and it is directly related to the degree of amorphousness of silica. This index has been developed to show the high degree of reactivity of the silica produced by the process of this invention. The index is arrived at by experimentally determining the percentage of available silica which dissolves in an excess of boiling ½ N. NaOH in a 3-minute extraction in a stainless steel beaker on a −325 mesh sample.

EXAMPLE V

The process of Example IV was repeated using, however, a large quantity of the Arkansas rice hulls in place of Sacramento, Calif., area rice hulls. The product had 8.4% carbon, was grayish black and the chemical composition of the loss on ignition free product was similar to the ash prepared from the Sacramento, Calif., material of Example IV and, as indicated below, was used to prepare a modified portland cement of exceptional strength characteristics.

EXAMPLES VI through IX

Portions of the amorphous silica ash from Examples IV and V were ground individually for 2 hours, in a ball mill with quick lime and different brands of ASTM Type III portland cements. In each case, a black or gray powder resulted, which upon mixing with water showed excellent hydraulic properties. To illustrate these properties, rice hull ash cement was prepared and cured in accordance with the standard ASTM mortar cube test method ASTM C109-70T and compressive strengths were determined. In all of the tests, the standard amount of Ottawa sand suggested in method C109-70T was employed.

On the 2-inch mortar cubes, the compressive strength shown in Table I indicate that cements of excellent high strength characteristics are produced.

TABLE I

| Ex. | Cement Composition Before Sand Addition | Water-Cement Ratio | Compressive Strength After Indicated Number of Days Aging - psi | | | Color |
|---|---|---|---|---|---|---|
| | | | 3 | 7 | 28 | |
| VI | 80% rice hull ash of Ex XIV + 20% quicklime | 0.57 | 1500 | 3500 | 5130 | Black |
| VII | 70% rice hull ash of Ex XIV + 30% Calaverous Brand Type III portland cement | 0.57 | 2390 | 3880 | 5140 | Black |
| VIII | 75% rice hull ash of Ex XIV + 25% Santa Cruz Brand Type III portland cement | 0.53 | 2480 | 4180 | 5570 | Black |
| IX | 70% rice hull ash of Ex XV + 30% Santa Cruz Brand Type III portland cement | 0.54 | 2580 | 5040 | 6500 | Grayish Black |
| Comparison | Min. ASTM requirements for general purpose portland cement (for reference purposes) | 0.50 | 1200 | 2100 | 3500 | Gray |

EXAMPLE X

A portion of rice hull ash from Example IV was subjected to 1100°F for 66 hours under oxidizing conditions in an electric furnace. The resulting material showed only 0.30% loss of weight on ignition and had a surface area of 6.5 square meters per gram. The Silica activity index was still 50+%. This relatively pure form of amorphous silica was further characterized by a refractive index of 1.43 and a density of about 2.0. This rice hull silica ash was compared in physical properties to other forms of silicon oxide and the results are indicated in Table II.

TABLE II

| | Density g/cc | Index of Refraction | Silica Activity Index, % |
|---|---|---|---|
| Quartz | 2.65 | 1.55 | 0.05 |
| Crystobalite | 2.32 | 1.48 | 4 |
| Obsidian | 2.25 | 1.47 | 4 |
| Rice Hull Ash (0.3% carbon Ex. XX) | 2.0 | 1.43 | 50 |
| Rice Hull Ash Ex. XIV | | | 53 |

EXAMPLE XI

A small quantity of off-white, low loss-on-ignition amorphous silica ash prepared as in Example X was ground in a laboratory mortar and pestle with 25% quicklime. The resulting cement was white in color and exhibited hardening characteristics when mixed with water.

Hydraulic cements exhibiting hardening characteristics may also be prepared by employing the siliceous ashes prepared by the process of this invention using from 5% to 50% by weight of lime and from 90 to 50% by weight of silica as the siliceous ashes containing from about 49 to about 98% silica. The precise amount of lime and siliceous ash employed is dependent upon the character of the cement desired and the amount of silica in the siliceous ash. Thus for ashes having a relatively large residual carbon content, cements may be prepared with relatively low percentages of lime and the amount of lime may be increased as the percentage of silica in the siliceous ash increases.

Similarly, when employing the siliceous ash of this invention with portland cement, cements may be prepared varying slightly from the proportions indicated in Table I, which nonetheless exhibit excellent compressive strengths.

The siliceous ashes prepared by the process of this invention are anhydrous when prepared. This has been demonstrated by conducting certain loss-on-ignition determinations referred to above under conditions of thermal gravimetric analysis. That is, the loss-on-ignition studies have been conducted while continuously weighing the sample. It was noted that all weight loss occurred at temperatures which indicated removal of residual carbon rather than removal of any hydrated material remaining after initial preparation of the ash.

EXAMPLE XII

To demonstrate the high acid resistance of the cement and mortar prepared from amorphous siliceous ashes, mortar cubes from Examples VI, VII and VIII, after 7 days of curing, were immersed in a 1% solution of hydrochloric acid. In addition, as a control, a typical ASTM Type I portland cement mortar cube was also subjected to the same test. At the end of 30 days, the cubes from Examples VI, VII and VIII showed no surface softening or etching while the Type I mortar cube showed evidence of acid deterioration by way of softening and etching.

In addition to the preparation of hydraulic cements, amorphous siliceous ashes may be employed as a base for catalysts and other active chemical agents where a siliceous material of relatively high surface area is useful. In addition, such siliceous ashes also find utility as fillers for plastic materials and such materials as natural and synthetic rubber, as well as other uses which depend upon having a silica of high reactivity and relatively high surface area.

EXAMPLE XIII

The process of Example IV was repeated except that the maximum temperature of the gas mass was set at about 1600°F. The siliceous ash product had from about 7 to about 9% carbon and showed some indication of crystalline character.

EXAMPLE XIV

The process of Example IV was repeated except that rice straw which had been chopped and ground to $-\frac{1}{4}$ inch was used instead of rice hulls. The resulting amorphous silica ash was ground with 25% by weight of CaO to prepare a hydraulic cement.

It should be noted that the temperatures referred to in the above examples are the measured temperatures of the gas mass in the furnace itself and probably do not reflect the actual particle temperature of the material being incinerated in the furnace 11. As is demonstrated by the disclosure of the patent application of P. K. Mehta referred to above, the incineration of silica containing organic material under conditions such that the incinerated particles reach a temperature above about 1250°F, usually leads to silica containing some crystalline material in the structure. In the process herein described, it appears that by conducting the exothermic combustion reaction under conditions of rapid gas flow, a much more rapid combustion occurs and, in effect, the combustible gasses produced by heating the organic material are distilled away from the particles and are oxidized by the hot air with sufficient rapidity that the particulate material does not reach the temperature of the gas mass. On the other hand, the fact that crystalline material (silica) is not produced at temperatures up to about 1550°F, may be attributable to the very short residence time of the material in the furnace.

It should also be made very clear that, since the reaction is exothermic, the gas inlet 17, is inactivated once the gas in the furnace 11, has been brought up to temperature and the combustion process established.

I claim:

1. A process for the incineration of siliceous organic plant material containing up to about 28% of $SiO_2$ which comprises tangentially introducing said material in an atmosphere of hot oxidizing gas, said gas being at combustion or incineration conditions, into a furnace having a circular cross section and a closed top, thereby causing said material to travel in an ascending helical path toward said closed top near the outer periphery of said furnace and thereby initiating an exothermic reaction and allowing said material to reach a temperature not in excess of 1300°F, but lower than the gas mass temperature of said furnace, whereupon the direction of flow reverses, causing said material to descend in said furnace in a generally helical path internal to said ascending helical path, and withdrawing all combustion products, amorphous product material, and combustion supporting gases from the bottom of said furnace.

2. The process of claim 1 wherein said material is subjected to an elevated gas mass temperature not in excess of about 1550°F.

3. A process for the preparation of a highly reactive, highly amorphous anhydrous material, derived from siliceous organic agricultural matter having an initial silica content of up to about 28%, which comprises tangentially introducing said material in an atmosphere of hot oxidizing gas, said gas being at combustion or incineration conditions into a furnace having a gas mass temperature not in excess of about 1550°F, a circular cross section and a closed top, thereby causing said material to travel in an ascending helical path toward said closed top near the outer periphery of said furnace and thereby initiating an exothermic reaction and allowing said material to reach a temperature lower than the gas mass temperature of said furnace, whereupon the direction of flow reverses, causing said material to descend in said furnace in a generally helical path internal to said ascending helical path, and withdrawing all amorphous product material, combustion products, and combustion supporting gases from the bottom of said furnace.

* * * * *